(12) United States Patent
Locker et al.

(10) Patent No.: US 9,001,061 B2
(45) Date of Patent: Apr. 7, 2015

(54) OBJECT MOVEMENT ON SMALL DISPLAY SCREENS

(75) Inventors: Howard Locker, Cary, NC (US); John Miles Hunt, Raleigh, NC (US); John Weldon Nicholson, Cary, NC (US); Scott Edwards Kelso, Cary, NC (US); Steven Richard Perrin, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 225 days.

(21) Appl. No.: 13/616,166

(22) Filed: Sep. 14, 2012

(65) Prior Publication Data

US 2014/0078066 A1 Mar. 20, 2014

(51) Int. Cl.
*G06F 3/041* (2006.01)
*G06F 3/0488* (2013.01)

(52) U.S. Cl.
CPC .................................. *G06F 3/04883* (2013.01)

(58) Field of Classification Search
USPC .................. 345/173, 174, 156, 660; 715/863; 725/60, 660
See application file for complete search history.

(56) References Cited

U.S. PATENT DOCUMENTS

| 2006/0101354 | A1* | 5/2006 | Hashimoto et al. | 715/863 |
| 2009/0315842 | A1* | 12/2009 | Peng et al. | 345/173 |
| 2010/0271318 | A1* | 10/2010 | Li | 345/173 |
| 2011/0261077 | A1* | 10/2011 | Chiu | 345/660 |
| 2011/0304584 | A1* | 12/2011 | Hwang | 345/174 |
| 2012/0167146 | A1* | 6/2012 | Incorvia | 725/60 |

* cited by examiner

*Primary Examiner* — Thuy Pardo
(74) *Attorney, Agent, or Firm* — Ference & Associates LLC

(57) ABSTRACT

An aspect provides a method, including: detecting a selection of an object on a touch screen display using touch based input; providing a visual indication of the object on the touch screen display in response to the detection of a selection; accepting gesture input at the touch screen display to fly out from the underlying document while maintaining the visual indication of the object on the touch screen display, such that during the fly out more of the underlying document is displayed; and moving the visual indication of the object about the underlying document in response to the accepted gesture input at the touch screen display. Other aspects are described and claimed.

20 Claims, 4 Drawing Sheets

OBJECT MOVEMENT ON SMALL DISPLAY SCREENS

BACKGROUND

Information handling devices ("devices"), for example cell phones, smart phones, tablet devices and even laptop and desktop computers, have display screens that offer touch based functionality. More and more people are using devices with small display screens, for example smart phones and tablet devices, because of the mobility made possible by the device's overall small size. However there are still some things that are inconvenient to do on mobile devices due to the small screens.

A good example of this is editing a long stream of information (for example, a long form blog, a document, et cetera). It is difficult to do certain actions, for example a copy or a cut and paste, over a long "distance" in the document, for example from page 4 of a document to page 31 of the same document. This is because the user cannot see the "to" and "from" places within the document on the small screen. Accordingly, although small, mobile devices offer many advantages, certain functionality is hindered by the presence of a small display screen.

BRIEF SUMMARY

In summary, one aspect provides a method, comprising detecting a selection of an object on a touch screen display using touch based input; providing a visual indication of the object on the touch screen display in response to the detection of a selection; accepting gesture input at the touch screen display to fly out from the underlying document while maintaining the visual indication of the object on the touch screen display, such that during the fly out more of the underlying document is displayed; and moving the visual indication of the object about the underlying document in response to the accepted gesture input at the touch screen display.

Another aspect provides an information handling device, comprising one or more processors; and a memory in operative connection with the one or more processors that stores instructions executable by the one or more processors to perform acts comprising: detecting a selection of an object on a touch screen display using touch based input; providing a visual indication of the object on the touch screen display in response to the detecting of a selection; accepting gesture input at the touch screen display to fly out from the underlying document while maintaining the visual indication of the object on the touch screen display, such that during the fly out more of the underlying document is displayed; and moving the visual indication of the object about the underlying document in response to the accepted gesture input at the touch screen display.

A further aspect provides a method, comprising a storage medium having program code embodied therewith, the program code comprising computer program code configured to detect a selection of an object on a touch screen display using touch based input; computer program code configured provide a visual indication of the object on the touch screen display in response to the detection of a selection; computer program code configured accept gesture input at the touch screen display to fly out from the underlying document while maintaining the visual indication of the object on the touch screen display, such that during the fly out more of the underlying document is displayed; and computer program code configured move the visual indication of the object about the underlying document in response to the accepted gesture input at the touch screen display.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
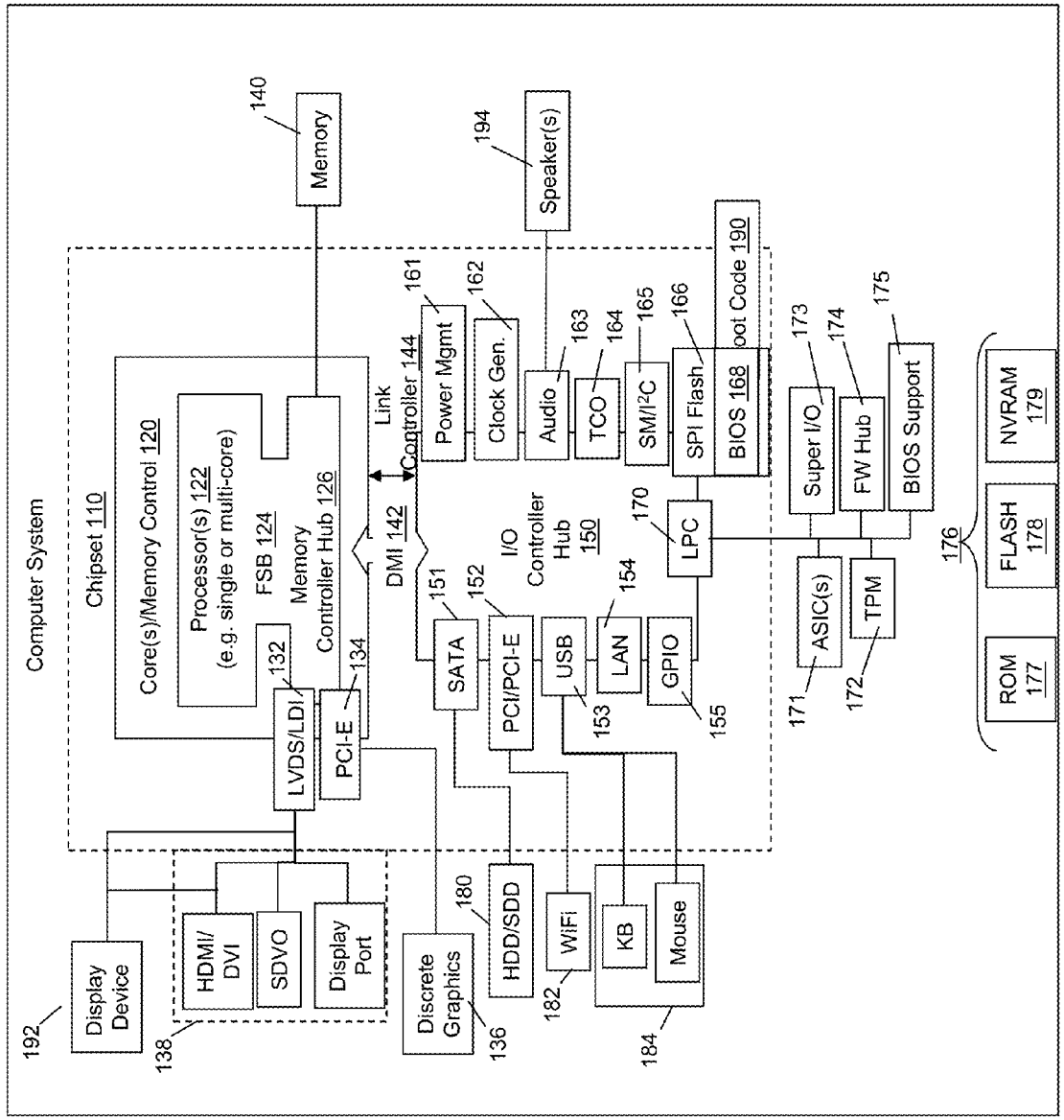
FIG. 1 illustrates an example information handling device and components thereof.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Currently, when using devices having small display screens, such as when using a smart phone or tablet touch screen, users have to cut or copy the object they want to move to a clipboard, then scroll through the document until the user finds where he or she wants to place the object. A problem with this is that the user often loses the look of what has been captured and it becomes difficult to see the relationship of the "from" and "to" locations in the document. This in turn creates difficulties in properly editing or revising documents, as an example.

An embodiment provides a way of visually representing a long distance on a small screen that is easier to understand and may be used in performing cut and paste, copy or other editing or object manipulation actions with the device. Accordingly, an embodiment provides a mechanism to make the small display screen (such as a touch screen display on a smart phone) more user-friendly for certain actions.

An embodiment provides functionality that is similar to an airplane taking off and landing. A user may select the object (text, image, et cetera) he or she wants to move using normal/standard selection gestures. Once selected, an embodiment simulates an airplane like functionality in the sense that the user can now gesture and move the object above the plane of the input field (visually gain altitude in the z-dimension above the document). As the user moves the object higher (via an appropriate gesturing) the object keeps the same size, and the input field gets smaller, thereby showing the user more of the input field (underlying document). This permits the user to move long distances simply by providing gestures.

Once the user sees where he or she wants to go with the object, the user can move the object over that part of the input field and start lowering the object closer to the input field—similar to an airplane landing. As the user gets closer with the object, the input field gets larger, thereby allowing for fine control of exactly where the user wants to place the object in the document.

The select, cut/copy, and paste gestures already exist, and an embodiment supplements these with new gestures that allow users to move the object up and down compared to the input field. Users can drag the object in any direction to simulate flying over the input field. A variety of touch based inputs may be utilized. An example includes the user using one finger on the object for a drag motion of the object (simulates flying the object around the document) without changing the up/down (zoom out/zoom in). An embodiment may utilize multiple gestures to implement the up/down (zoom out/zoom in) of the object above the document.

Non-limiting examples of multi-gesture input include using two fingers on the object to enable up/down functionality, and then using one finger held in place and a second finger dragging forward to implement up (fly out) or lift, with the second finger going backwards to implement down (fly in) or descent functionality. Another option is to select text, then double-tap the selection to take off and come to some default "altitude" (degree of fly or zoom). Then pinching with fingers on the touch screen may raise or lower the altitude, while swiping adjusts the object's position in the x and y directions. Once a user finds where he or she wants to go in the document, then the user can lower the altitude by providing a pinching input. A user may "land" or place the object with another double tap, completing the editing action.

The illustrated example embodiments will be best understood by reference to the figures. The following description is intended only by way of example, and simply illustrates certain example embodiments.

Figure 2:
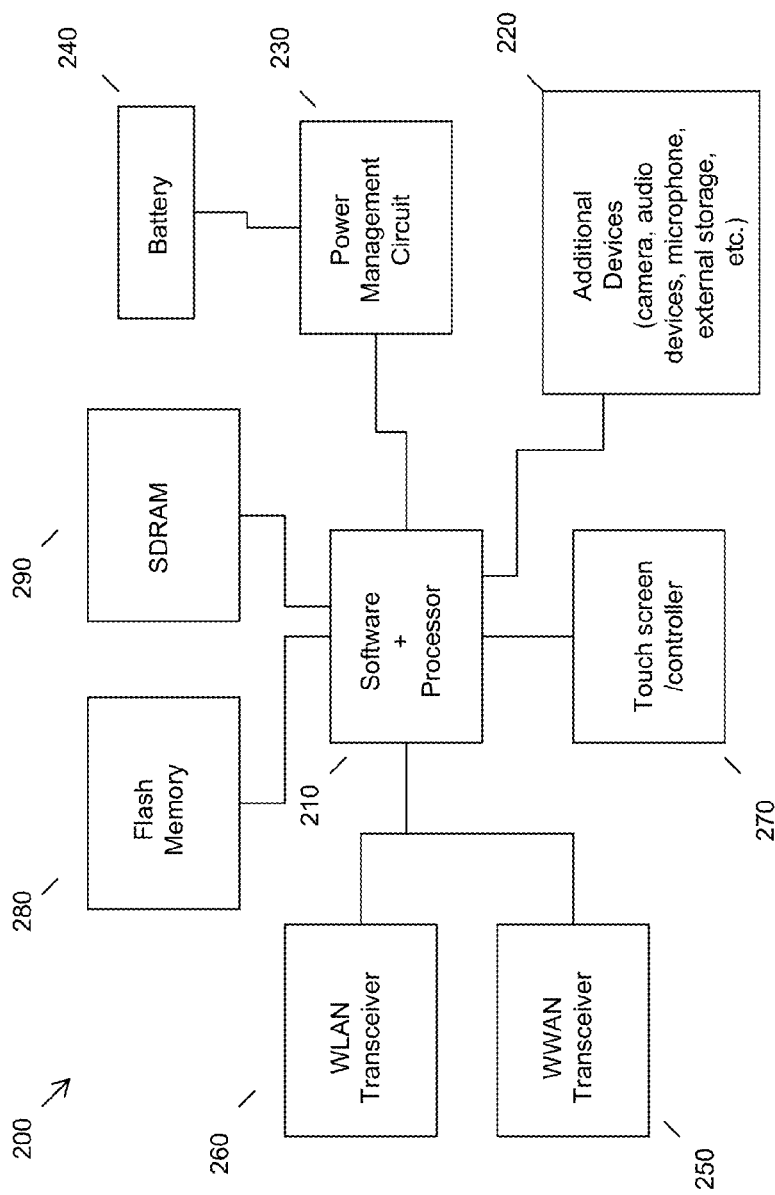
FIG. 2 illustrates another example information handling device and components thereof.

While various other circuits, circuitry or components may be utilized, referring to FIG. 2 with regard to smart phone and/or tablet circuitry 200, an example includes an ARM based system (system on a chip) design, with software and processor(s) combined in a single chip 210. Internal busses and the like depend on different vendors, but essentially all the peripheral devices (220) may attach to a single chip 210. In contrast to the circuitry illustrated in FIG. 1, the tablet circuitry 200 combines the processor, memory control, and I/O controller hub all into a single chip 210. Also, ARM based systems 200 do not typically use SATA or PCI or LPC. Common interfaces for example include SDIO and I2C. There are power management chip(s) 230, which manage power as supplied for example via a rechargeable battery 240, which may be recharged by a connection to a power source (not shown), and in at least one design, a single chip, such as 210, is used to supply BIOS like functionality and DRAM memory.

ARM based systems 200 typically include one or more of a WWAN transceiver 250 and a WLAN transceiver 260 for connecting to various networks, such as telecommunications networks and wireless base stations. Commonly, an ARM based system 200 will include a touch screen 270 for data input and display. ARM based systems 200 also typically include various memory devices, for example flash memory 280 and SDRAM 290.

FIG. 1 depicts a block diagram of one example of information handling device circuits, circuitry or components. The example depicted in FIG. 1 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 1.

The example of FIG. 1 includes a so-called chipset 110 (a group of integrated circuits, or chips, that work together, chipsets) with an architecture that may vary depending on manufacturer (for example, INTEL, AMD, ARM, etc.). The architecture of the chipset 110 includes a core and memory control group 120 and an I/O controller hub 150 that exchanges information (for example, data, signals, commands, et cetera) via a direct management interface (DMI) 142 or a link controller 144. In FIG. 1, the DMI 142 is a chip-to-chip interface (sometimes referred to as being a link between a "northbridge" and a "southbridge"). The core and memory control group 120 include one or more processors 122 (for example, single or multi-core) and a memory controller hub 126 that exchange information via a front side bus (FSB) 124; noting that components of the group 120 may be integrated in a chip that supplants the conventional "northbridge" style architecture.

In FIG. 1, the memory controller hub 126 interfaces with memory 140 (for example, to provide support for a type of RAM that may be referred to as "system memory" or "memory"). The memory controller hub 126 further includes a LVDS interface 132 for a display device 192 (for example, a CRT, a flat panel, touch screen, et cetera). A block 138 includes some technologies that may be supported via the LVDS interface 132 (for example, serial digital video, HDMI/DVI, display port). The memory controller hub 126 also includes a PCI-express interface (PCI-E) 134 that may support discrete graphics 136.

In FIG. 1, the I/O hub controller 150 includes a SATA interface 151 (for example, for HDDs, SDDs, 180 et cetera), a PCI-E interface 152 (for example, for wireless connections 182), a USB interface 153 (for example, for devices 184 such as a digitizer, keyboard, mice, cameras, phones, microphones, storage, other connected devices, et cetera), a network interface 154 (for example, LAN), a GPIO interface 155, a LPC interface 170 (for ASICs 171, a TPM 172, a super I/O 173, a firmware hub 174, BIOS support 175 as well as various types of memory 176 such as ROM 177, Flash 178, and NVRAM 179), a power management interface 161, a clock generator interface 162, an audio interface 163 (for example, for speakers 194), a TCO interface 164, a system management bus interface 165, and SPI Flash 166, which can include BIOS 168 and boot code 190. The I/O hub controller 150 may include gigabit Ethernet support.

The system, upon power on, may be configured to execute boot code 190 for the BIOS 168, as stored within the SPI Flash 166, and thereafter processes data under the control of one or more operating systems and application software (for example, stored in system memory 140). An operating system may be stored in any of a variety of locations and accessed, for example, according to instructions of the BIOS 168. As described herein, a device may include fewer or more features than shown in the system of FIG. 1.

Figure 3:
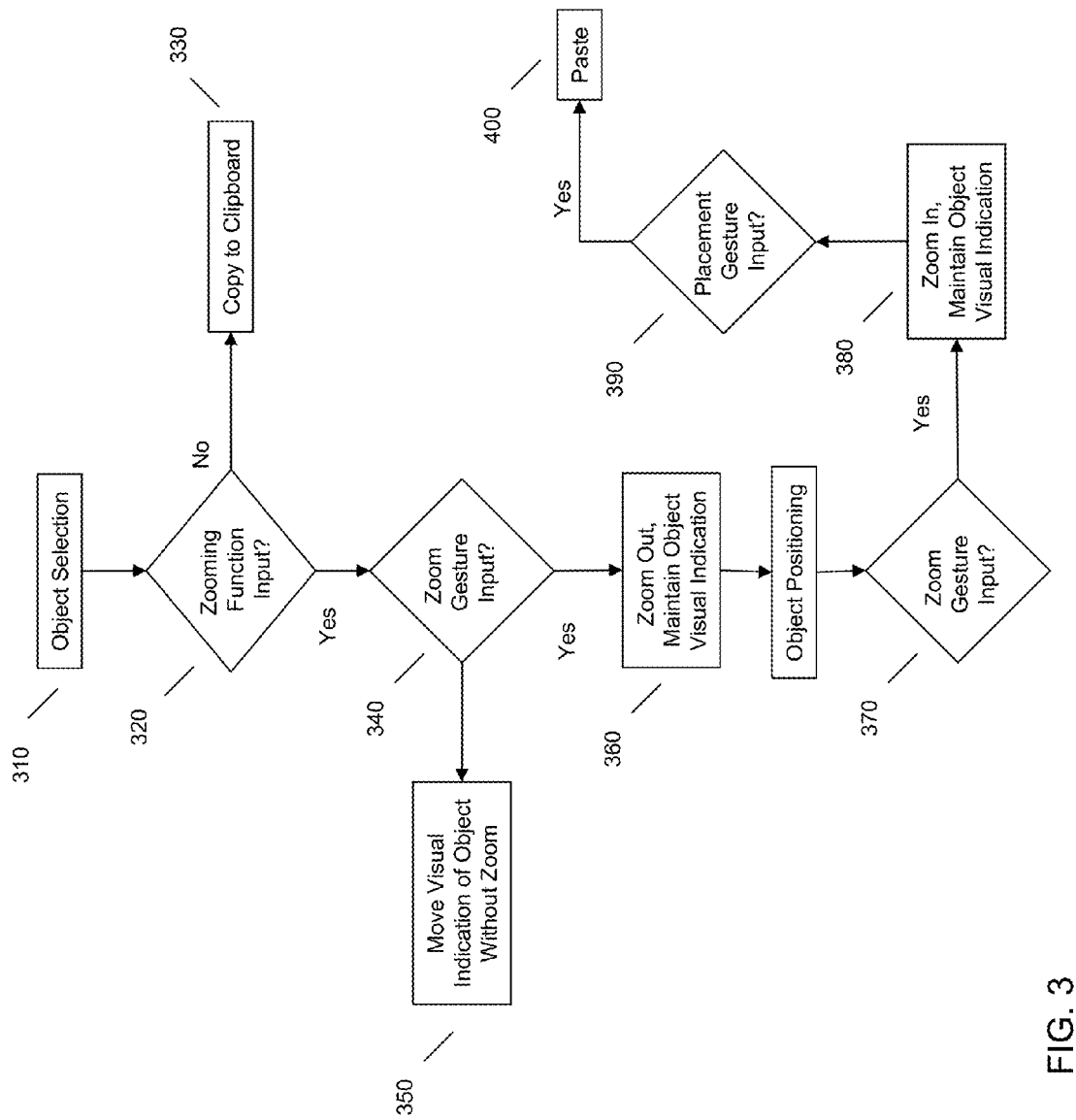
FIG. 3 illustrates an example method of object movement on a small display screen.

Referring to FIG. 3, an example of object movement on a small display screen is illustrated. When a user touches a display screen to move an object (an example of cut and paste movement for text will be used herein as a non-limiting example), the object is selected for movement 310. Various standard mechanisms for accomplishing this function on a touch screen display of a device 410 may be used, for example a press and hold on the text, followed optionally by moving or positioning "handles" around the text to refine the selection.

Once the object is selected, an embodiment determines if a fly functionality is desired at 320. If so, for example via provisioning a popup menu prompting a user for an appropriate selection or ascertaining multi-touch within the object's visual depiction 402, a fly functionality for moving the object is enabled. Alternatively, a user gesture may be used to indicate a fly functionality. Although any appropriate gesture may be used, one such gesture would be a two fingered gesture by the user to indicate a fly functionality. Thus, when the user moves two fingers forward after having selected an object, the object flies up, and when the user moves two fingers backwards the object flies down. Otherwise, the object (for example, selected text) may simply be copied to a clipboard for standard handling 330.

Figure 4:
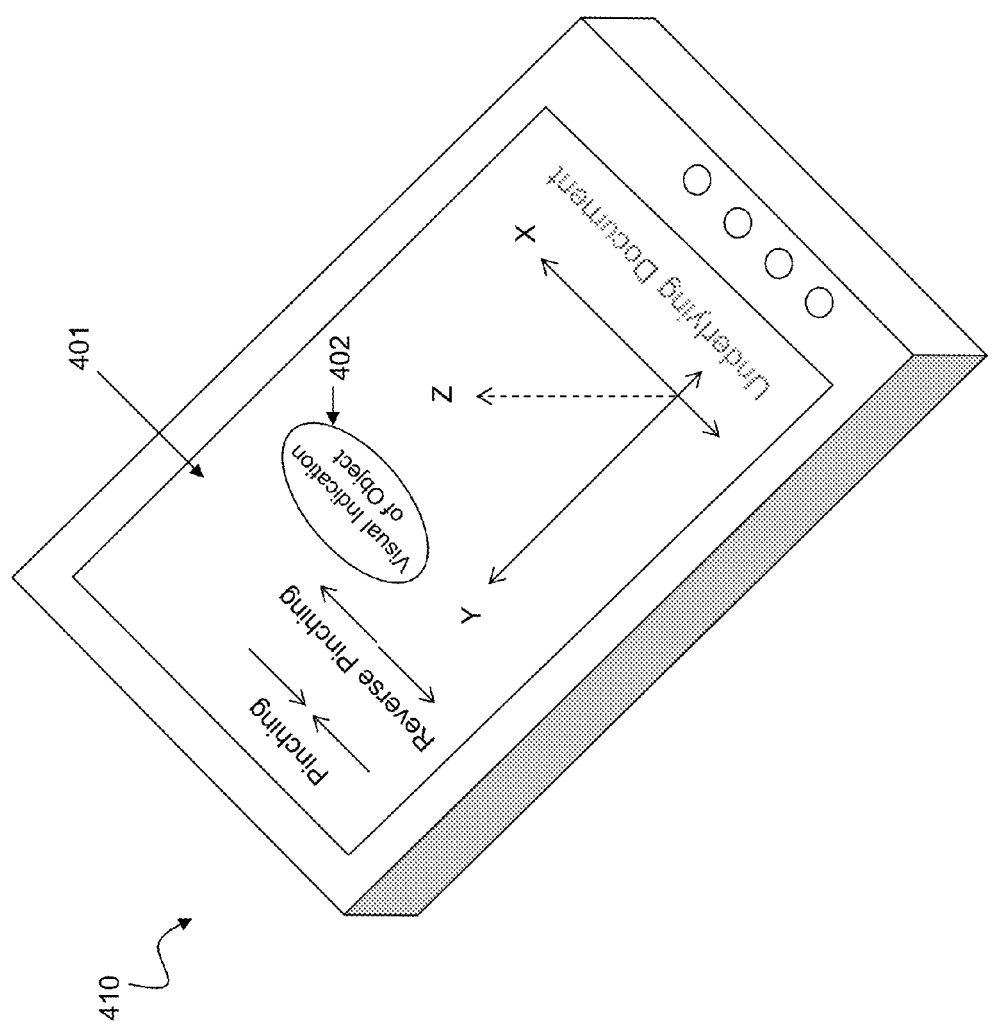
FIG. 4 illustrates an example mobile device with a small display screen.

Responsive to an indication that a fly functionality is desired, a user may provide fly input in the form of gesture input. If fly input is thereafter detected 340, for example a drag of a finger in the "y" direction, FIG. 4, an embodiment may fly out from the underlying document (making more of the underlying document visible) while maintaining the visual indication of the object 402. Otherwise, the object's visual indication 402 may be moved throughout the document by simply dragging the object's visual indication 402 in the desired direction with respect to the underlying document without flying 350.

The visual indication of the object 402 may take a variety of forms. In one embodiment, a popup window or like visual representation or icon is provided that includes the selected text or a portion thereof. For example, a semi-transparent visual window type indication of the selected text may be provided such that the user has a visual cue of what has been copied. Alternatively, a separate icon not containing the object (or a portion thereof) may be provided as a visual indication. The visual indication of the object 402 may maintain its size throughout the various flying functions (flying in and out of the underlying document). The visual indication 402 may further be highlighted, colored or provided another such visually distinguishing treatment.

Thus, responsive to a flying gesture, the underlying document may be flied out (providing a greater amount of the underlying document as being visible in the small touch screen 401), while the visual indication of the object 402 is maintained 360. The flying gestures described herein may take a variety of forms, including for example a finger drag in forward or reverse directions (along the y axis) on the touch screen outside of the visual indication of the object 402, or pinching and reverse pinching multi-touch inputs on the touch screen outside of the visual indication of the object 402, and the like. Throughout, in an embodiment, the visual indication of the object 402 may remain essentially the same size.

Once flied out from the underlying document, a user may scroll the object about the screen, for example by touching the visual indication of the object 402 and dragging it in x and y directions about the touch screen 401. Thus, a user is enabled to quickly cover large distances (pages) in a document by virtue of zooming the underlying document out and dragging the object's visual indication 402 to an appropriate location.

Once the user has found the page or portion thereof desired, the user may provide additional gesture input to fly back into the underlying document, while maintaining the visual indication of the object 402. The flying in function may be thought of as the reverse of the flying out function, and opposite gestures may be used to accomplish the same, including for example a finger drag in an opposite direction (along the y axis) on the touch screen outside of the visual indication of the object 402, or a reverse pinching multi-touch input on the touch screen outside of the visual indication of the object 402, and the like. Thus, responsive to detecting a flying in gesture 370, an embodiment flies the underlying document in again 380.

A user may place the object into its new location by providing a placement gesture. This may be a simple tap at the new position in the document, as provided to the touch screen, or may be implemented by manipulating the object's visual indication 402 into the appropriate location and holding it there for a predetermined time. A popup window may ask the user to confirm this placement gesture prior to implementing the placement, and may provide the user with a visual representation or preview of what the placement gesture would result in. Thus, responsive to detecting a placement gesture 390, the object is placed (in this example, text pasted) into the new position 400, and the visual indication of the object 402 is removed. Alternatively, a user may just fly down low enough until the cut object is inside the document, then the user would move the object around in a conventional manner for final placement.

Accordingly, an embodiment provides for user inputs to allow flying out or "gaining altitude" of a visual indication of an object with respect to an underlying document, similar to an airplane taking off with respect to the ground, such that the underlying document (similar to the ground) provides a broader view of the appropriate location for object placement, even if a small touch screen display is being utilized. Thus, an embodiment facilitates quick and user-friendly object movements within even large documents using a small device having a small display screen.

While the various example embodiments have been described in connection with manipulating text-based objects in various editing functions, these were provided as non-limiting examples. Accordingly, embodiments may be used to move other objects (for example images) in other contexts (for example, repositioning thereof rather than cut and paste). Similarly, although devices having small display screens (such as smart phones and tablet computing devices) have been used in the description, embodiments may be utilized in connection with other types of devices and displays, for example, e-readers, laptop computers, desktop computers, kiosks, and the like.

It will also be understood that the various embodiments may be implemented in one or more information handling devices configured appropriately to execute program instructions consistent with the functionality of the embodiments as described herein. In this regard, FIG. 1 and FIG. 2 illustrate non-limiting examples of such devices and components thereof.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

Any combination of one or more non-signal device readable medium(s) may be utilized. The non-signal medium may be a storage medium. A storage medium may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider) or through a hard wire connection, such as over a USB connection.

Aspects are described herein with reference to the figures, which illustrate example methods, devices and program products according to various example embodiments. It will be understood that the actions and functionality illustrated may be implemented at least in part by program instructions. These program instructions may be provided to a processor of a general purpose information handling device, a special purpose information handling device, or other programmable data processing device or information handling device to produce a machine, such that the instructions, which execute via a processor of the device implement the functions/acts specified.

The program instructions may also be stored in a device readable medium that can direct a device to function in a particular manner, such that the instructions stored in the device readable medium produce an article of manufacture including instructions which implement the function/act specified.

The program instructions may also be loaded onto a device to cause a series of operational steps to be performed on the device to produce a device implemented process such that the instructions which execute on the device provide processes for implementing the functions/acts specified.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
   detecting a selection of an object on a touch screen display using touch based input;
   providing a visual indication of the object on the touch screen display in response to the detection of a selection;
   accepting gesture input at the touch screen display to fly out from the underlying document while maintaining the visual indication of the object on the touch screen display, such that during the fly out more of the underlying document is displayed; and
   moving the visual indication of the object about the underlying document in response to the accepted gesture input at the touch screen display.

2. The method of claim 1, further comprising accepting gesture input at the touch screen display to fly in on the underlying document while maintaining the visual indication of the object on the touch screen display;
   wherein during the fly out, the object keeps the same size and an input field of the underlying document gets smaller.

3. The method of claim 2, wherein the gesture input at the touch screen display to fly in on the underlying document comprises a drag in the y direction on the touch screen display.

4. The method of claim 3, wherein the gesture input at the touch screen display to fly in on the underlying document comprises a reverse pinching gesture on the touch screen display.

5. The method of claim 2, further comprising accepting gesture input at the touch screen display to place the object in a new location in the underlying document.

6. The method of claim 5, wherein the gesture input at the touch screen display to place the object in a new location in the underlying document comprises tap input.

7. The method of claim 1, wherein the object is text or an image.

8. The method of claim 1, wherein the gesture input at the touch screen display to fly out from the underlying document comprises a drag in the y direction on the touch screen display.

9. The method of claim 8, wherein the gesture input at the touch screen display to fly out from the underlying document comprises a pinching gesture on the touch screen display.

10. An information handling device, comprising:
    one or more processors; and
    a memory in operative connection with the one or more processors that stores instructions executable by the one or more processors to perform acts comprising:
    detecting a selection of an object on a touch screen display using touch based input;
    providing a visual indication of the object on the touch screen display in response to the detecting of a selection;
    accepting gesture input at the touch screen display to fly out from the underlying document while maintaining the visual indication of the object on the touch screen display, such that during the fly out more of the underlying document is displayed; and
    moving the visual indication of the object about the underlying document in response to the accepted gesture input at the touch screen display.

11. The information handling device of claim 10, further comprising instructions executable by the one or more processors to perform accepting gesture input at the touch screen display to fly in on the underlying document while maintaining the visual indication of the object on the touch screen display.

12. The information handling device of claim 11, wherein the gesture input at the touch screen display to fly in on the underlying document comprises a drag in the y direction on the touch screen display.

13. The information handling device of claim 12, wherein the gesture input at the touch screen display to fly in on the underlying document comprises a reverse pinching gesture on the touch screen display.

14. The information handling device of claim 11, further comprising instructions executable by the one or more processors to perform accepting gesture input at the touch screen display to place the object in a new location in the underlying document.

15. The information handling device of claim 14, wherein the gesture input at the touch screen display to place the object in a new location in the underlying document comprises tap input.

16. The information handling device of claim 10, wherein the object is text or an image.

17. The information handling device of claim 10, wherein the gesture input at the touch screen display to fly out from the underlying document comprises a drag in the y direction on the touch screen display.

18. The information handling device of claim 17, wherein the gesture input at the touch screen display to fly out from the underlying document comprises a pinching gesture on the touch screen display.

19. A program product, comprising:
a storage medium having program code embodied therewith, the program code comprising:
computer program code configured to detect a selection of an object on a touch screen display using touch based input;
computer program code configured provide a visual indication of the object on the touch screen display in response to the detection of a selection;
computer program code configured accept gesture input at the touch screen display to fly out from the underlying document while maintaining the visual indication of the object on the touch screen display, such that during the fly out more of the underlying document is displayed; and
computer program code configured move the visual indication of the object about the underlying document in response to the accepted gesture input at the touch screen display.

20. The computer program product of claim 19, further comprising computer program code configured to accept gesture input at the touch screen display to fly in on the underlying document while maintaining the visual indication of the object on the touch screen display.

* * * * *